United States Patent [19]

Redford

[11] Patent Number: 5,339,095
[45] Date of Patent: Aug. 16, 1994

[54] MULTI-MEDIA POINTING DEVICE

[75] Inventor: Peter M. Redford, Los Gatos, Calif.

[73] Assignee: TV Interactive Data Corporation, Calif.

[21] Appl. No.: 804,240

[22] Filed: Dec. 5, 1991

[51] Int. Cl.⁵ .............................................. G09G 5/08
[52] U.S. Cl. .................................... 345/158; 345/169
[58] Field of Search ............... 340/706, 707, 709, 710; 359/142, 145, 146, 159, 143, 144, 147, 148; 358/194.1; 250/221, 231.1; 345/156, 157, 158, 169; 273/438

[56] References Cited

U.S. PATENT DOCUMENTS

| | | | |
|---|---|---|---|
| 4,154,000 | 5/1979 | Kramer | 33/366 |
| 4,682,159 | 7/1987 | Davison | 340/709 |
| 4,839,838 | 6/1989 | La Biche et al. | 364/709 |
| 4,862,172 | 8/1989 | Ross | 341/157 |
| 4,864,647 | 9/1989 | Harrington | 359/145 |
| 5,045,843 | 9/1991 | Hansen | 340/709 |
| 5,059,958 | 10/1991 | Jacobs et al. | 340/709 X |
| 5,063,376 | 11/1991 | Chang | 340/706 |
| 5,068,645 | 11/1991 | Drumm | 340/709 X |
| 5,115,236 | 5/1992 | Kohler | 359/142 |
| 5,142,655 | 8/1992 | Drumm | 340/710 X |

FOREIGN PATENT DOCUMENTS 3236436 1/1984 Fed. Rep. of Germany .

Primary Examiner—Jeffery Brier

[57] ABSTRACT

A multi-media pointing device including a handheld, self-contained remote unit having a set of command buttons and a microphone mounted on the exterior of the remote unit housing. Contained within the housing are a pair of angular motion detectors, keyboard and motion data processing circuitry, and infrared or radio frequency transmission circuitry. The preferred embodiment further includes a separate base module having infrared or radio frequency receiver circuitry, circuitry for interfacing to a computer, and output ports for sending the received keyboard, motion and audio signals to the computer.

35 Claims, 12 Drawing Sheets

KEY TO FIG. 5

| FIG. 5A | FIG. 5B |

MULTI-MEDIA POINTING DEVICE

BACKGROUND OF THE INVENTION

1. Field of the Invention

This invention relates generally to multimedia peripheral apparatus, and more particularly to an improved wireless multimedia pointing and data-entry device and system.

2. Brief Description of the Prior Art

Personal computer driven video and multimedia presentation systems are replacing static slide and overhead shows for business executives, training personnel and teachers. In addition, personal computers disguised as video disc players or "interactive television" systems are being introduced into the home to replace the conventional encyclopedias, to entertain children and to simplify such mundane tasks as balancing the checkbook.

In general, modern computer multimedia system software employs graphical user interfaces, including windows, icons and pull-down menus, for the user to access and control the system. Such interfaces require both pointing (graphical) and alphanumeric input, which have been traditionally provided via a mouse and keyboard. However, conventional keyboards and mice were designed to be used while sitting at a desk, directly in front of a display monitor. Computer multimedia applications, in contrast, are typically not used at a desk; business and educational presentations are generally done while standing in front of a large screen, while home multimedia applications are generally accessed from an armchair position.

TV-type remote control units are available that can serve as remote keyboards for multimedia systems. However, these remote keyboards usually do not provide means for pointer input; as such, they are virtually useless with the graphical "window" oriented user interfaces that characterize modern multimedia software. In other systems, wireless optical pointing devices, such as that disclosed in U.S. Pat. No. 5,045,843 issued to P. Hansen, provide pointer input to a computer; however, these devices provide no provision for alphanumeric input, thus drastically limiting their usefulness for multimedia systems. Further, these pointing devices require a complex configuration of lenses, filters, light sources and detectors, a two-way communication link between the remote control and the receiver, and complex electronic circuitry, thus making them prohibitively expensive for widespread multimedia use, especially in the home multimedia market.

SUMMARY OF THE INVENTION

It is therefore a primary objective of the present invention to provide a multimedia input device and system that accepts and transmits both alphanumeric and pointer data to a remote computer driven display device.

Another object of the present invention is to provide a multimedia input device that senses angular motion in free-space and translates this motion into pointer data for transmission to a remote receiver.

A further objective of the present invention is to provide a multimedia input device of the type described that transmits data to a remote computer driven display over a wireless communications link.

An additional objective of the present invention is to provide a multimedia input device that accepts and transmits audio input, in addition to alphanumeric and pointer data, to a remote computer.

Yet another objective of the present invention is to provide a multimedia input device of the type described that transmits pointer data to the computer in the same format as a traditional mouse.

Still another objective of the present invention is to provide a multimedia input device built using existing mass produced electronic components to provide an inexpensive, accurate and reliable data input tool.

Briefly, a preferred embodiment of the present invention includes a handheld, self-contained remote unit, including a set of command buttons and a microphone mounted on the exterior of the remote unit housing and a pair of angular motion detectors, keyboard and motion data processing circuitry, and infrared or radio frequency transmission circuitry all mounted inside the remote housing. The preferred embodiment further includes a separate base module, consisting of infrared or radio frequency receiver circuitry, internal circuitry for interfacing to a computer, and output ports for sending the keyboard, motion and audio signals to the computer.

An important advantage of the present invention is that it integrates a keyboard, a mouse pointer and a microphone for wireless remote operation of, and communication to, a computer or computer-driven display from a standing or armchair position.

Another advantage of the present invention is that it senses motion in free space, allowing true "point and shoot" operation for graphical multimedia systems.

A further advantage of the present invention is that it can use radio frequency communication, thus allowing position-independent operation, not requiring the user to face the base unit, and allowing the base unit to be mounted inside the computer, which simplifies setup and increases reliability of the system.

Yet another advantage of the present invention is that it uses optical bubble motion detectors, which are more accurate, less expensive and more reliable than the technology used in competing wireless pointing devices.

Still another advantage of the present invention is that it sends keyboard and motion data over the same data channel, sending both through the mouse port of the computer, thus reducing the complexity of the system and relieving the need for connecting the base unit to the keyboard port of the computer.

These and other objects and advantages of the present invention will no doubt become apparent to those skilled in the art after having read the following detailed description of the preferred embodiment which is contained in and illustrated by the various drawing figures.

IN THE DRAWINGS

Figure 5A:
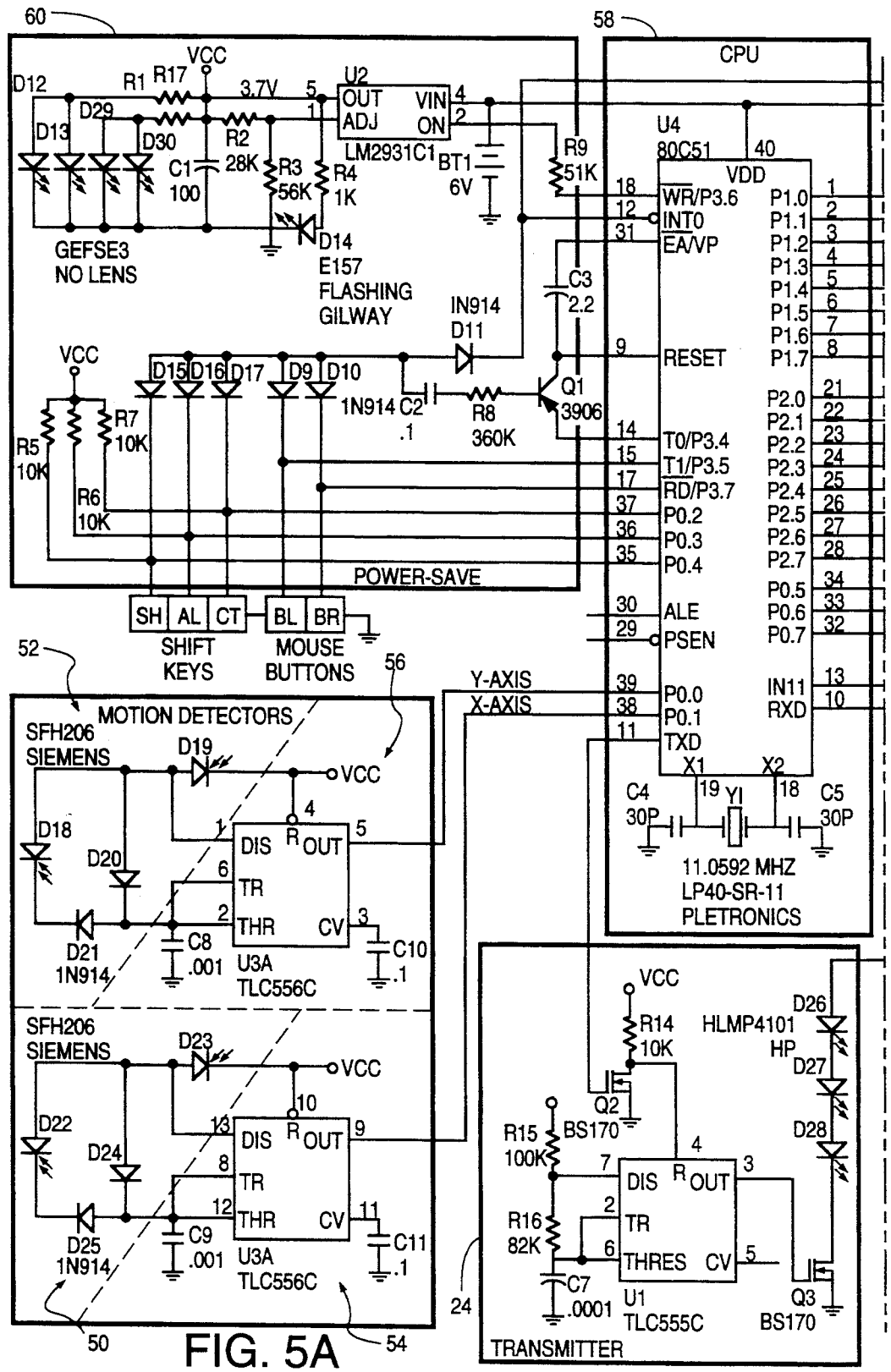
Figures 5, 5B:
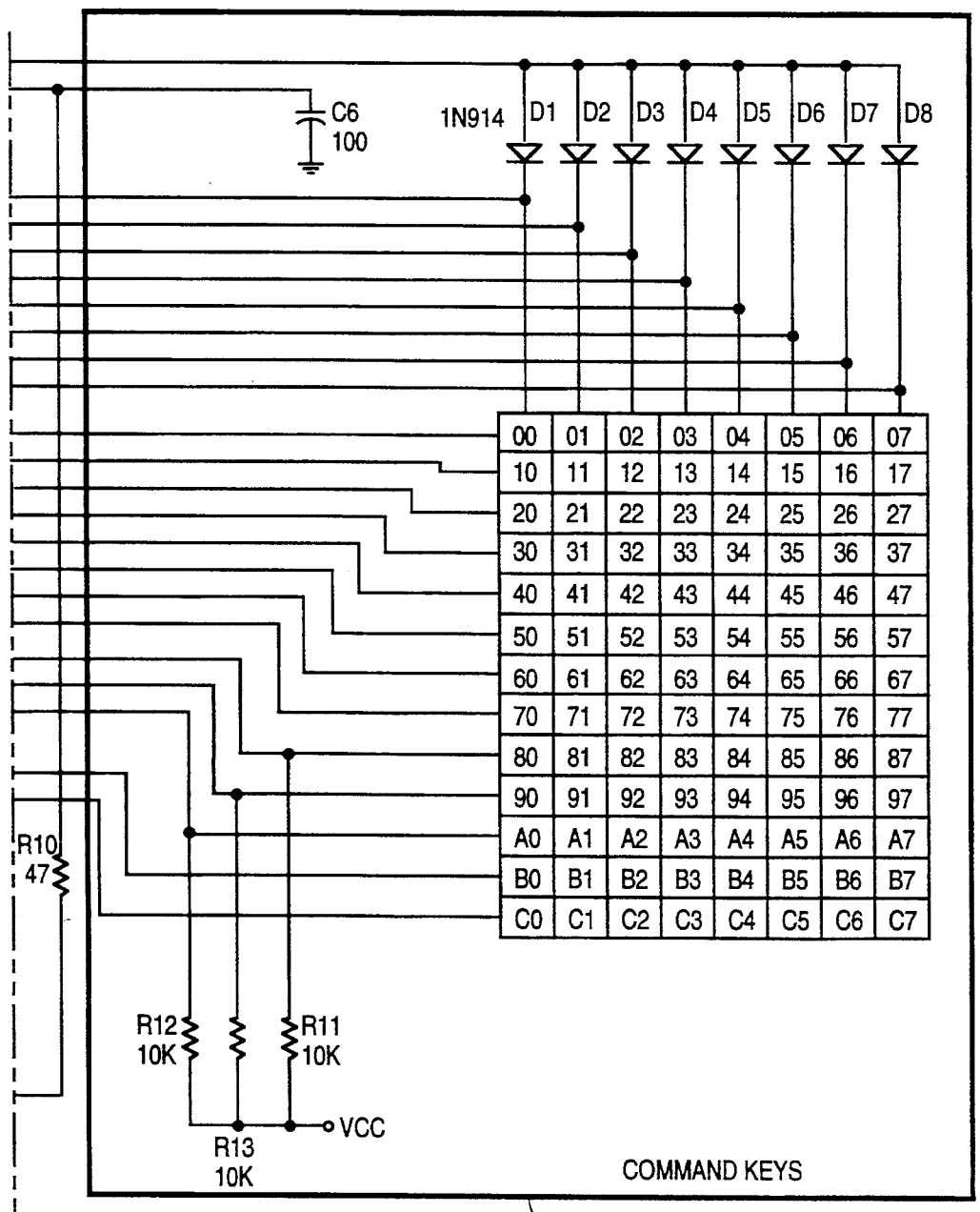
Figure 6:
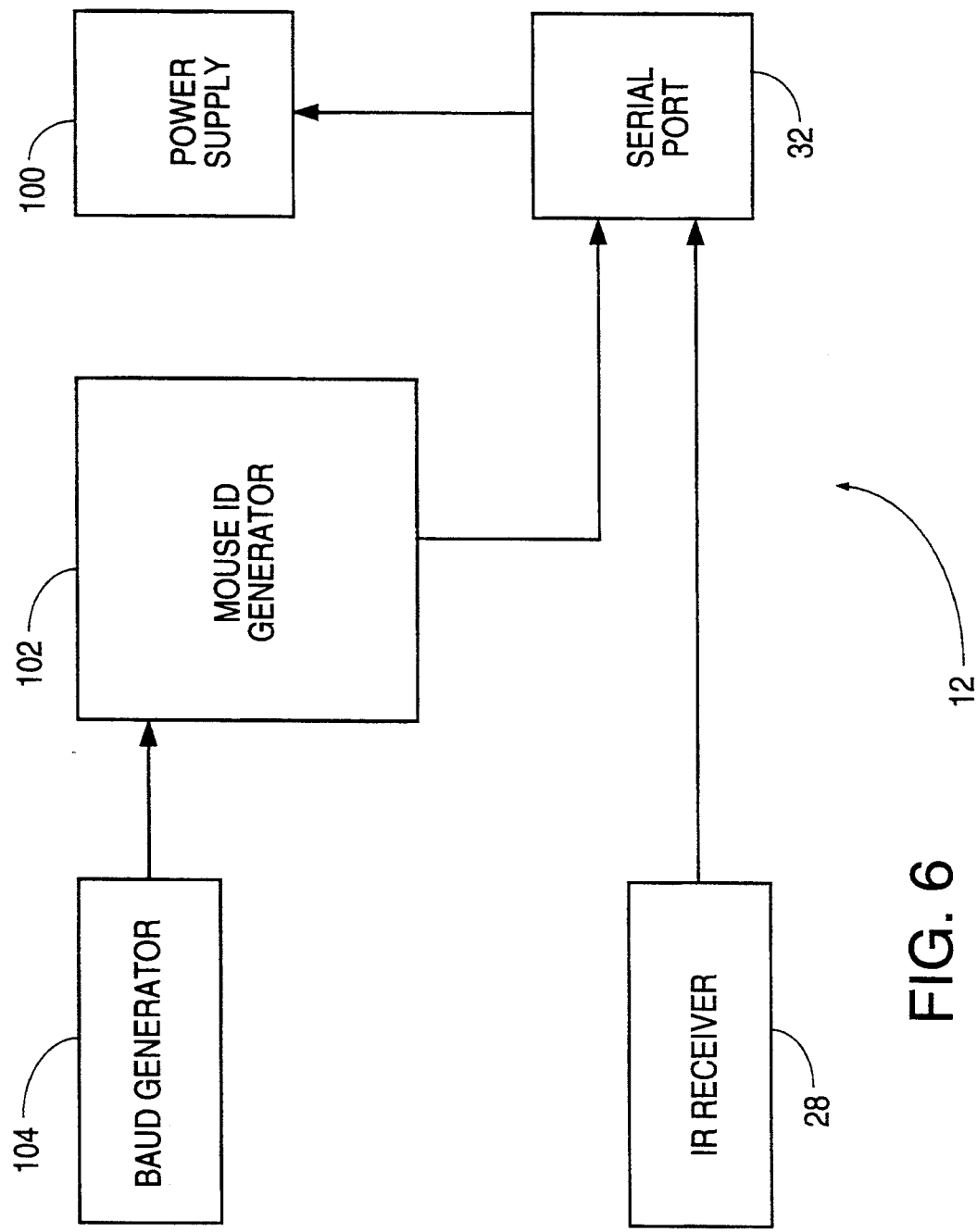
Figure 7:
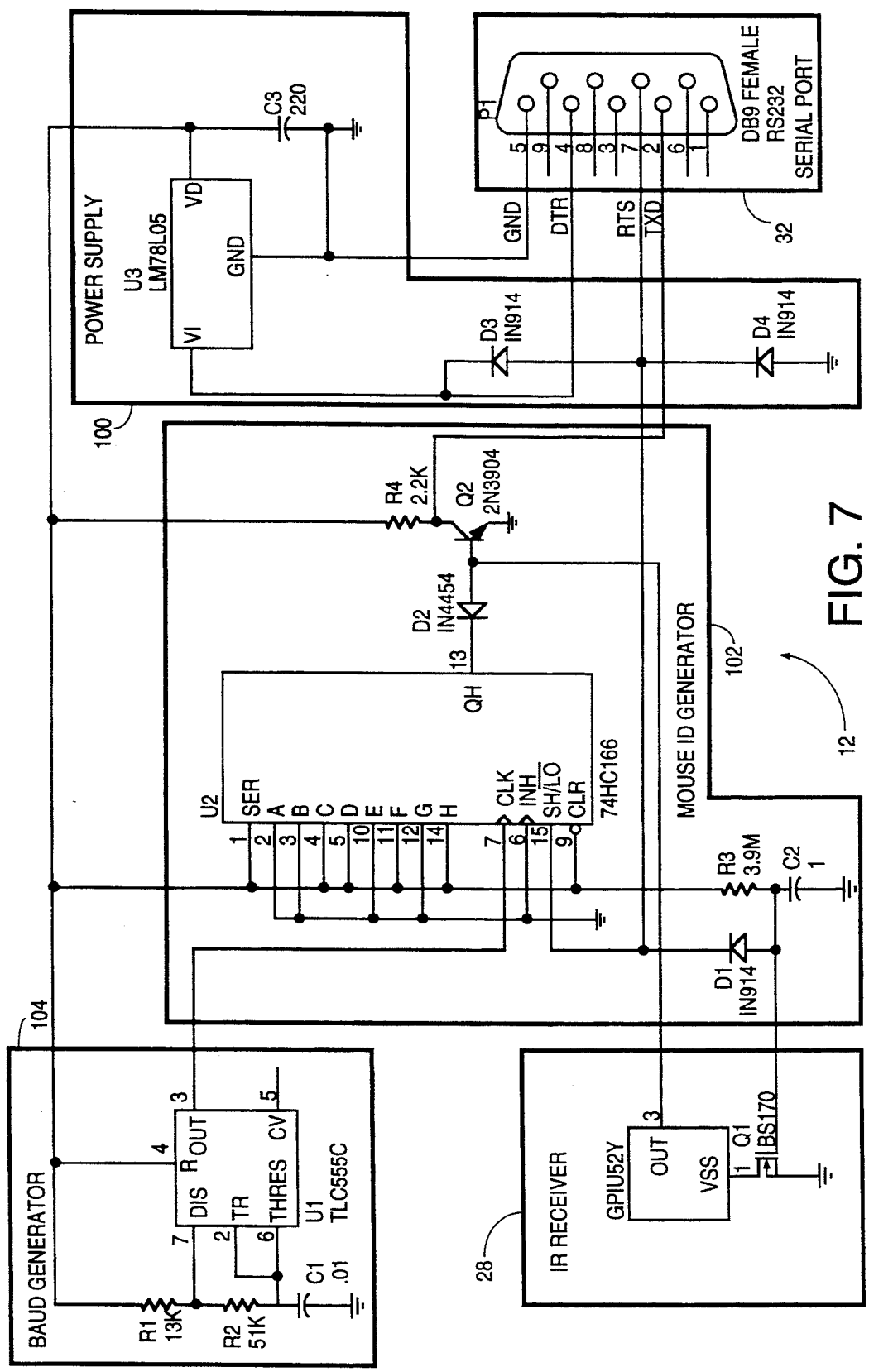
Figure 8:
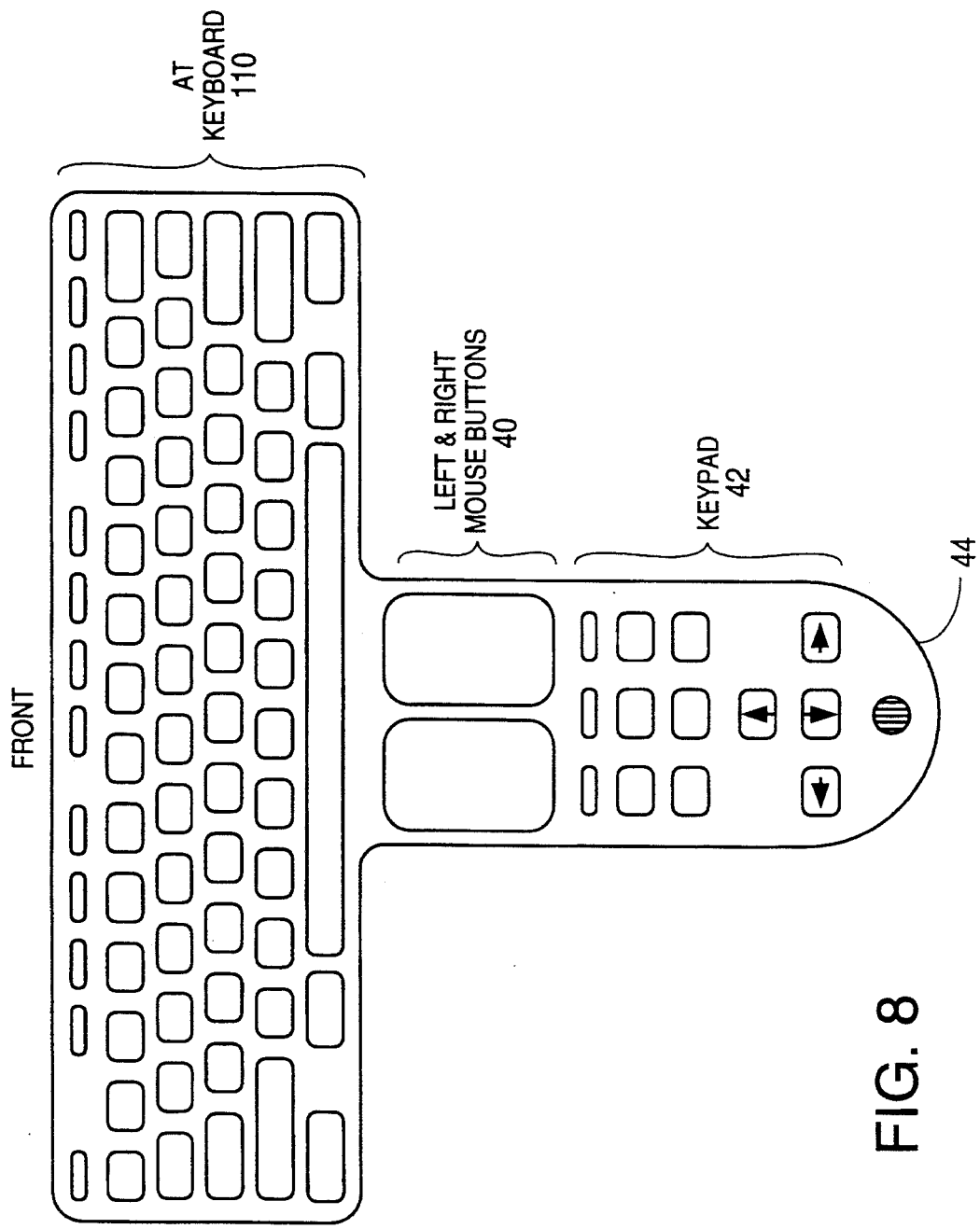
Figure 9A:
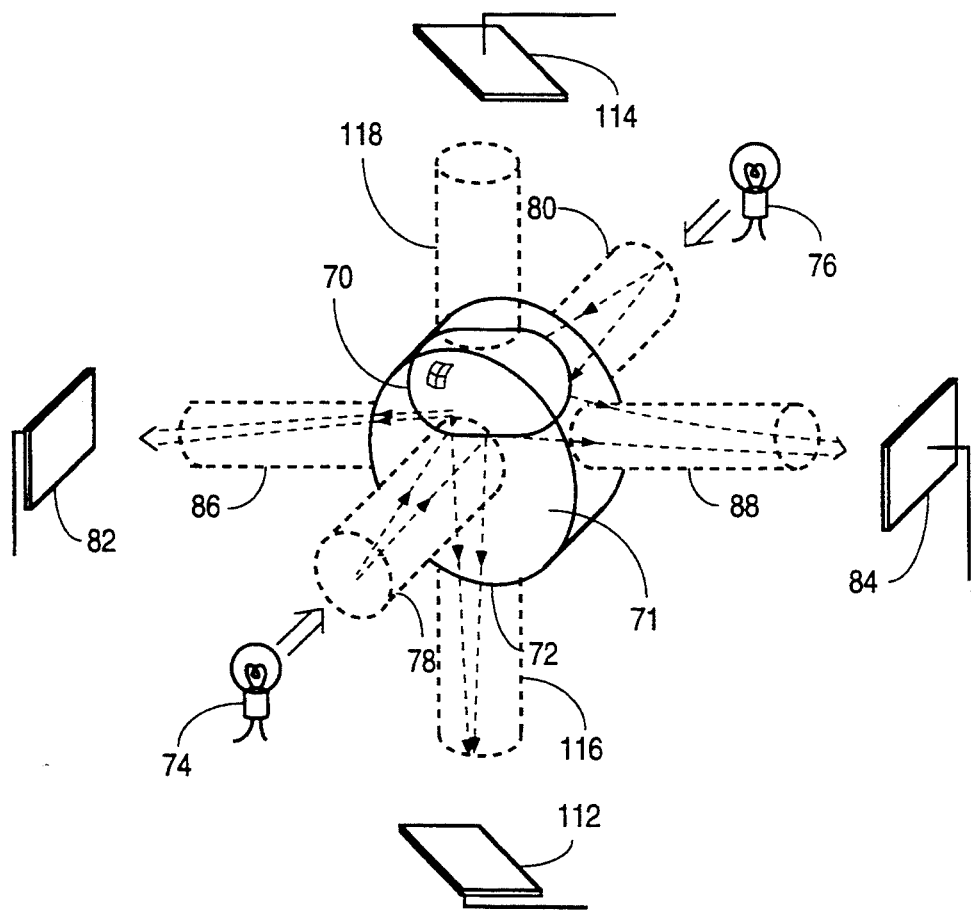
Figure 9B:
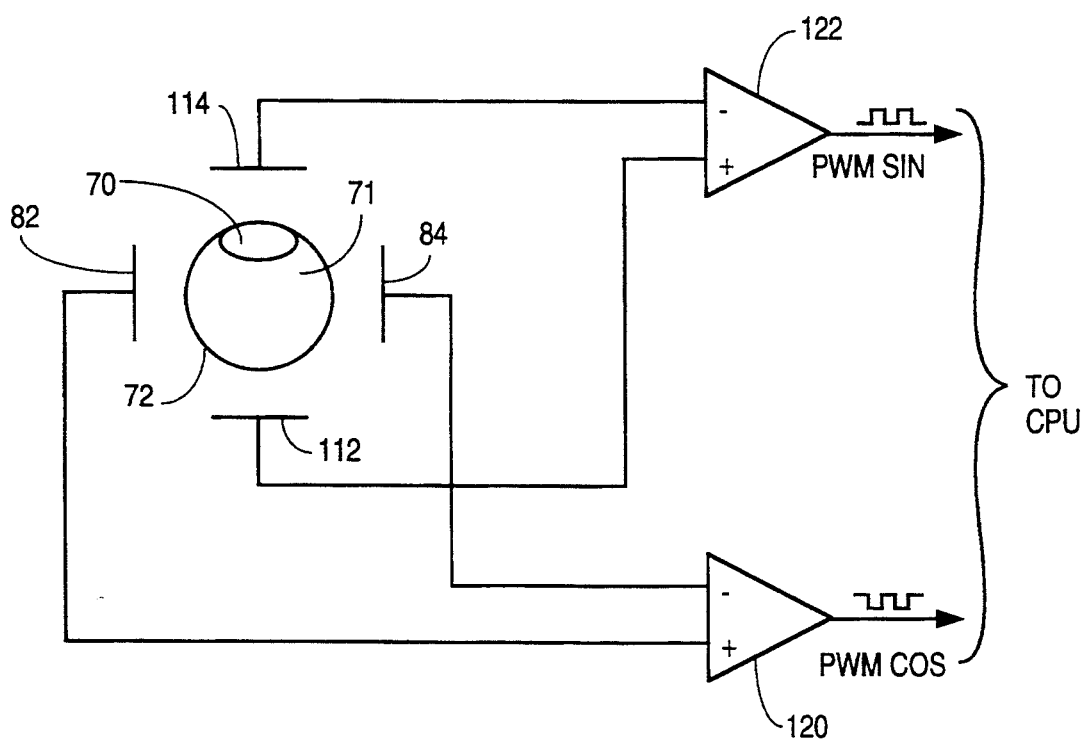

FIG. 5, 5(A) and 5(B) are schematics of an actual implementation of the remote unit of the present invention;

FIG. 6 is a block diagram showing the principal components of the base unit of a preferred embodiment of the present invention;

FIG. 7 is a schematic of an actual implementation of the base unit of the present invention;

FIG. 8 is an illustration showing an alternate embodiment of the remote unit of the present invention;

FIG. 9(a) is a functional representation of an alternate embodiment of an angular motion detector in accordance with the present invention; and FIG. 9(b) is a schematic showing an implementation of the alternate embodiment of the angular motion detector in accordance with the present invention.

DETAILED DESCRIPTION OF THE PREFERRED EMBODIMENT

This invention relates to an improved remote pointing and data-entry system for use in association with a multimedia display system or the like.

Figure 1:
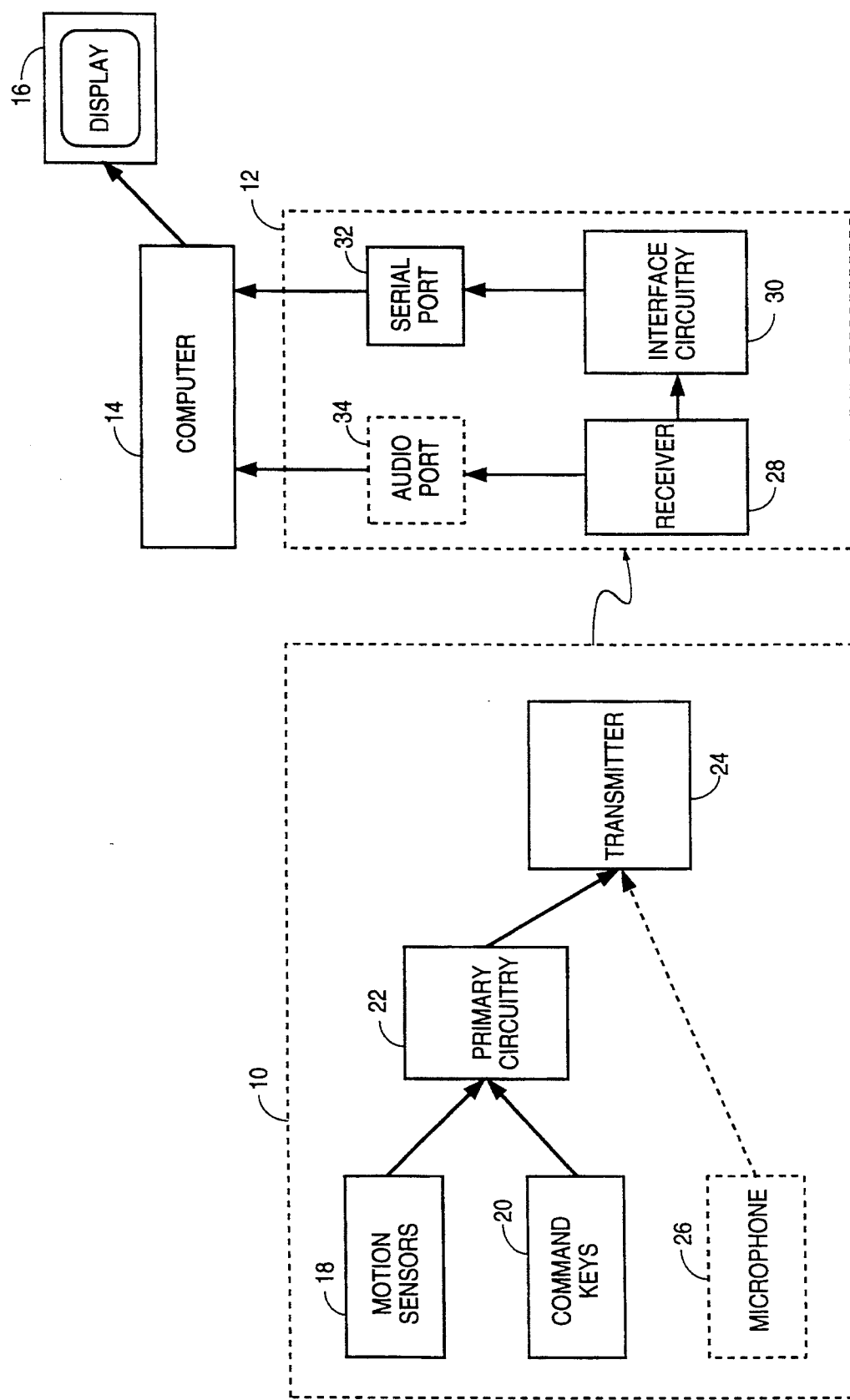
FIG. 1 is a block diagram of a preferred embodiment of the invention.

In FIG. 1 of the drawing, a high level block diagram of a multimedia display system in accordance with a preferred embodiment of the present invention is shown. As depicted, the system includes a handheld remote unit 10 and a separate base unit 12 connected to a computer 14 which drives a display 16. The remote unit 10 is comprised of angular motion sensors 18, an array of command keys 20, processing circuitry 22 and a transmitter 24. Optionally, a microphone 26 may also be included in the remote unit to permit audio input. The base unit 12 includes receiver circuitry 28, interface circuitry 30, a serial port 32 and, optionally, an audio port 34.

Functionally, angular motion of the remote unit 10 is detected by the motion sensors 18, which send signals to the processing circuitry 22 indicating the angular position of the remote unit. In addition, any activated command key 20 sends a signal to the processing circuitry 22 indicating which key has been activated. The processing circuitry 22 encodes the motion and command key data into a format compatible with the computer 14, and sends this encoded data to the transmitter 24, which transmits the data. Optionally, the microphone 26 can accept audio information such as speech, and send this audio signal to the transmitter 24. The transmitter 24 takes the audio signal and transmits it over a separate channel.

The receiver circuitry 28 receives the signals transmitted by the transmitter 24. The data signal is sent to the interface circuitry 30, which in turn passes the data signal on to the serial port 32 which is connected to the mouse input port of the computer 14. Optionally, the receiver circuitry 28 can receive and forward an audio signal to the audio port 34, which is connected to the audio input port of the computer 14.

In operation, as the remote is tilted left, right, up or down, this angular motion is sensed and appropriate signals transmitted to the computer via the base unit, causing corresponding movement of a cursor on the screen. Further, when a command key is pressed, an appropriate signal is sent to the base unit, which forwards the signal to the computer, causing a character to appear on the screen, or causing some other function to be executed. If the optional microphone is present, any audio picked up by the microphone is sent to the base unit and passed on to the computer for processing.

Figure 2:
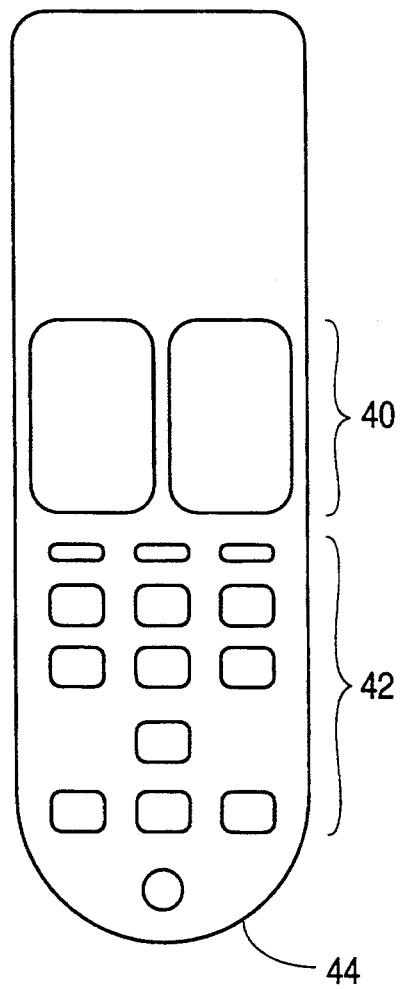
FIG. 2 is an illustration showing a preferred embodiment of the remote unit of the present invention.

Referring now to FIG. 2, an illustration of a preferred embodiment of the remote unit of the present invention is shown. In this embodiment, two mouse buttons 40, an extended AT keypad 42, and a microphone 44 appear on the top surface of the remote unit. This allows the remote to have an elongated shape similar to TV remote control units. Alternatively, a vertical, generally cylindrical handle (not shown) may be attached to the bottom surface of the remote unit, thus allowing the user to point the unit like a pistol. Further, a one or more trigger-like button may be mounted to the handle, allowing the user to operate the mouse buttons with the triggers.

Figure 3:
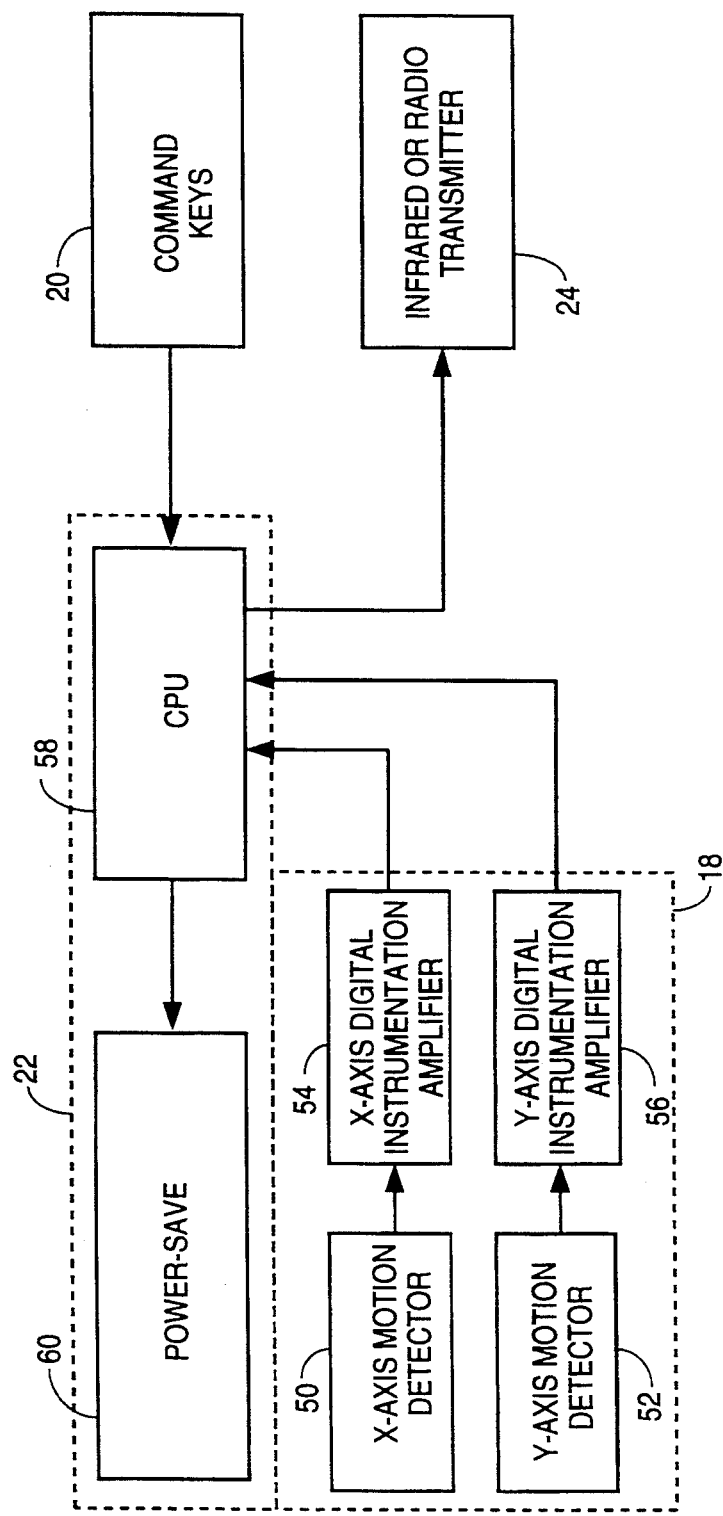
FIG. 3 is a block diagram showing the principal components of the remote unit of a preferred embodiment of the present invention.

Referring now to FIG. 3, a more detailed block diagram showing the principal components of the handheld remote unit 10 is shown. As depicted, the remote unit includes X-axis and Y-axis angular motion detectors 50 and 52, X-axis and Y-axis digital instrumentation amplifiers 54 and 56, a central processing unit (CPU) 58, the array of command keys 20, power-save circuitry 60 and an infrared or radio frequency transmitter 24.

Functionally, motion of the remote unit is detected by the X-axis and Y-axis angular motion detectors 50 and 52. Position dependent differential currents produced by the motion detectors are fed into the X-axis and Y-axis Digital Instrumentation Amplifiers 54 and 56 respectively, where they are converted to differential pulse-width modulated (PWM) signals. The high part of the PWM signal represents the positive part of the differential signal, while the low part of the PWM represents the negative part of the differential signal.

The CPU 58 derives absolute motion values by subtracting the high part of the PWM from the low part. The CPU also performs jitter filtering, combines the motion data with data from the command keys 20, formats the data into an RS232C serial format and outputs it to the transmitter 24. The transmitter 24 modulates the signal and transmits it. The remote further includes power-save circuitry 60, which automatically turns the device off when no motion or keystroke is detected for a few seconds. The remote can be "awakened" by pressing any key.

Figure 4A:
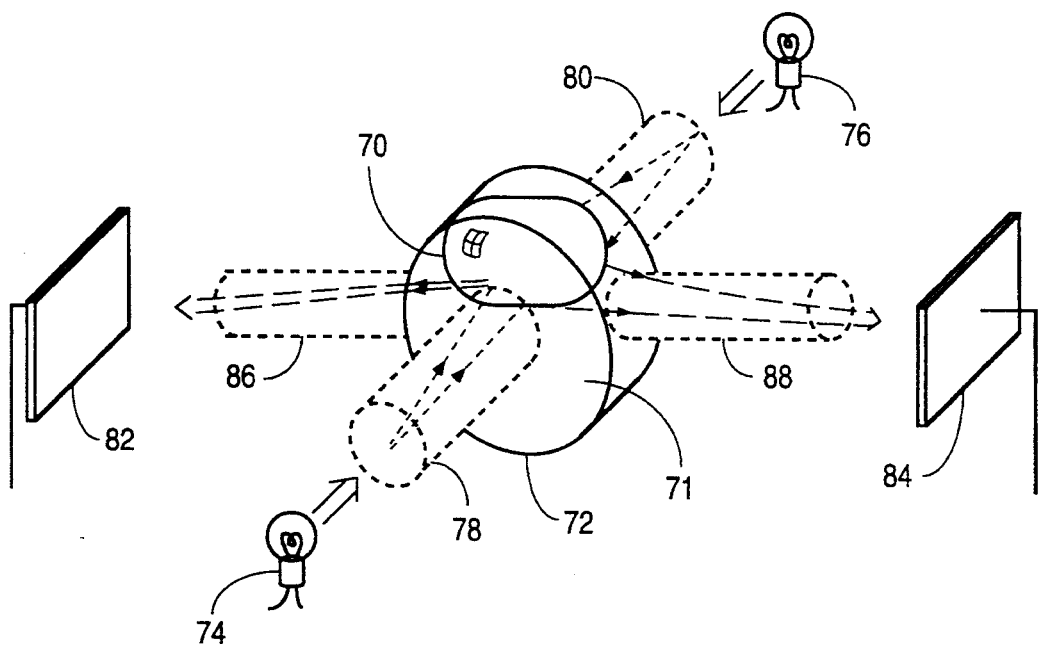
FIG. 4(a) is a functional representation of an angular motion detector in accordance with the present invention.

Referring now to FIG. 4(a), a functional representation of an angular motion detector in accordance with the present invention is shown. The detector includes a bubble 70, of air or other gas for example, suspended in a liquid 71, such as a light oil for example, contained within a transparent cylindrical container 72, surrounded by two light sources 74 and 76 that transmit light via light pathways 78 and 80 positioned facing each other so that they each illuminate liquid 71 through one of the round faces of the container 72. In the illustrated embodiment, the container 72 is positionable relative to a "horizontal plane" and has a "first axis" extending along its axis of symmetry, and a "second axis" extending along a diameter thereof. As is well known, the interface between two dissimilar materials, such as the bubble 70 and the liquid 71, will form a surface which, depending on the particular materials used, will be more or less reflective. Two light-measuring sensors 82 and 84 receive light reflected from bubble 70 via light pathways 86 and 88 which are positioned 180 degrees apart along the circumference of the cylindrical container 72. The pathways 78, 80, 86 and 88 may be formed by free space, a transparent medium or a "light pipe" of any suitable type. The light sources 74 and 76 are positioned along the first axis, and the sensors 82 and 84 are positioned along the second axis and are fixed relative to the container 72 by any suitable means.

In operation, as the angular orientation of the detector changes, the bubble 70 moves around the circumference of the container 72 in response to gravity. Both round faces of the tube are illuminated by light sources 74 and 76, which may be light emitting diodes (LEDs) or any other appropriate light source. The angular motion of the detector is detected by sensing the light reflected from the bubble 70 onto the two light-measuring sensors 82 and 84, which face each other on opposite sides along the circumference of the container 72. The sensors 82 and 84, which may be photodiodes, phototransistors, or any sensors that are sensitive to light intensity, produce differential current in relation to the angular position of the bubble relative to the container 72. As the bubble 70 moves, more light is reflected to one sensor than the other, causing the current from one sensor to decrease as the current in the other sensor increases. Sensor currents are equal when the bubble 70 is positioned at 90 degrees relative to the centerline of pathways 86 and 88, and differ when the bubble is at any other position. Although the difference in sensor output may not be linearly related to angular orientation, the angular relationships of the detector to the output currents are repeatable.

Figure 4B:
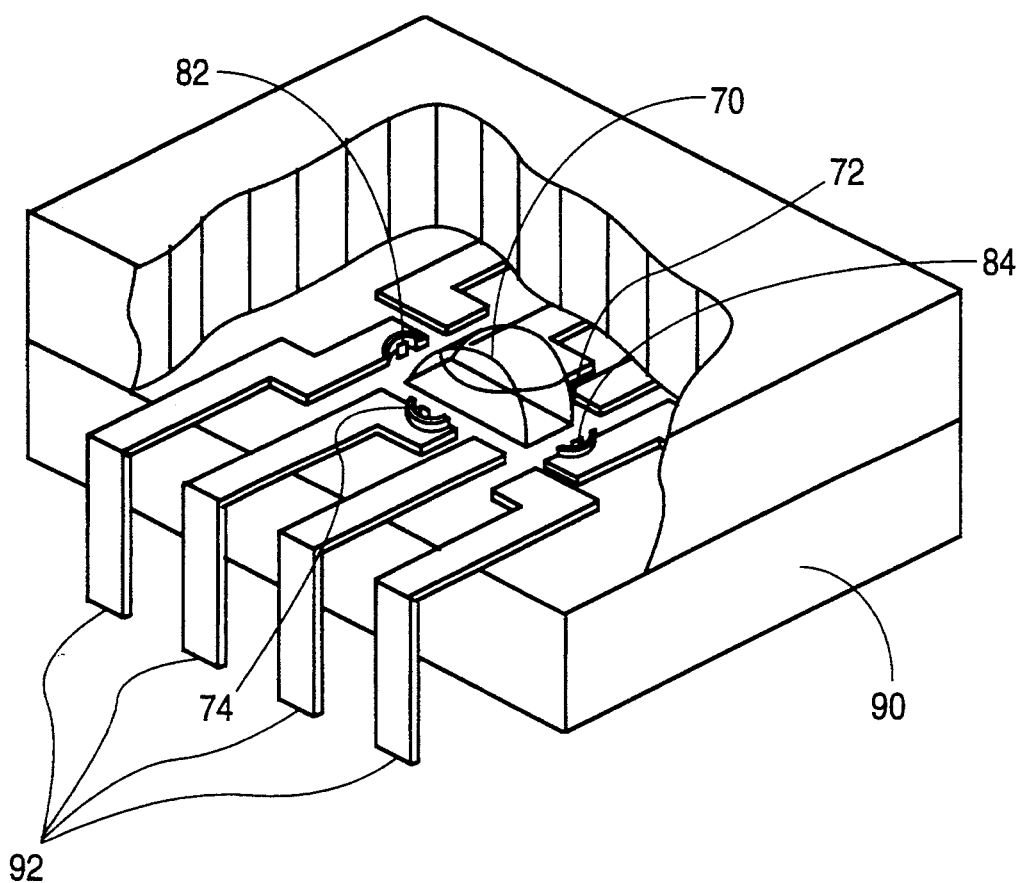
FIG. 4(b) is an illustration of an actual implementation of an angular motion detector in accordance with the present invention.

In FIG. 4(b), an illustration of an actual implementation of an angular motion detector in accordance with the present invention is shown. A sealed cylindrical cavity 72 formed in a dual-inline package (DIP) housing 90 is almost filled with a liquid 71, such that a small air bubble 70 is left in the cavity 72. Two infrared light emitting diodes (LEDs) 74 and 76 are positioned in the housing 90 facing each other so that they each illuminate one of the round faces of the cavity 72. Two infrared photodiodes 82 and 84 are positioned in the housing 90, 180 degrees apart along the circumference of the cylindrical cavity 72. Eight conductive traces 92 connected to the LEDs 74 and 76 and the photodiodes 82 and 84 protrude from the DIP housing 90 forming leads for connection to external circuitry. The DIP housing 90 is fabricated from a material that is transparent to infrared light, preferably of daylight filter plastic so that ambient light does not affect the photodiodes.

The illustrated motion detector is capable of detecting angular orientation about one axis, i.e., about the axis defined by a line passing through the sources 74 and 76. Therefore, in order to detect two-dimensional angular orientation of the remote unit, two angular motion detectors are required, mounted with their sensory axes oriented perpendicular to each other so that two-dimensional angular orientation is detectable.

Referring now to FIG. 5, a detailed electronic schematic of an actual implementation of the remote unit of the present invention is shown. As depicted, the remote unit includes X-axis and Y-axis angular motion detectors 50 and 52, preferably of the type described above, X-axis and Y-axis digital instrumentation amplifiers 54 and 56, a central processing unit (CPU) 58, an array of command keys 20, power-save circuitry 60 and an infrared transmitter 24.

For purposes of this discussion, operation of the X-axis circuitry will be explained; however, operation of the Y-axis circuitry is identical. Differential currents produced by the photo diodes D22 and D23 (which respectively correspond to the sensors 82 and 84 described above) are fed to a novel digital instrumentation amplifier (DIA) 54. The digital instrumentation amplifier is actually a direct, differential analog-to-digital converter. Normally, the conversion of low-level analog signals to digital (for computer processing in real-world, noisy environments) is performed in two stages: amplification of the signal by an instrumentation amplifier, and conversion to digital by an analog-to-digital converter (ADC). The conventional instrumentation amplifier is one of the most useful applications of an IC op amp. It finds widespread use in signal processing due to its inherent rejection of common-mode noise and the linear amplification of DC and low frequency AC signals. AC and DC signals are commonly received from a transducer, amplified, and then transmitted in a single-ended mode to an ADC. Since the desired signal may have a full-scale amplitude of typically only a few millivolts, while common-mode noise may be several volts, common-mode rejection is critical to the overall accuracy of the amplifier. The output of an instrumentation amplifier is a voltage whose amplitude is equal to the difference between two input voltages multiplied by a gain factor.

Several problems exist with conventional instrumentation amplifiers:
* They are very expensive ($10 per chip).
* They offer only finite amplifications and must be often followed with single-ended amplifier stages.
* They have an input voltage offset, limiting their ability to amplify very small, sub-millivolt signals.
* Their output is analog and for computer applications must be sent to an (expensive) ADC where noise is easily picked up and accuracy is easily lost.

The direct ADC method developed for use in the present invention overcomes the problems associated with instrumentation amplifiers and analog-to-digital converters because the double-ended analog signal from a transducer is input directly to the digital instrumentation amplifier (DIA), in many cases requiring no pre-amplification. The output of the DIA is a pulse-width modulated (PWM) square wave that can be applied directly to a microprocessor for analysis. This output waveform contains the double-ended (differential) signal information and the microprocessor can digitally filter out any noise.

A general representation of the DIA could use voltage, current, light or temperature controlled resistors to control the rate at which a capacitor is charged and discharged. The configuration of the DIA used in the present invention uses light controlled resistors (photodiodes) as the control inputs.

The DIA 54 used in the present invention is based on the Signetics SE555 timer chip U3B configured as a 50% duty cycle oscillator. In this configuration, capacitor C9 is alternately charged through photo diode D23 and diode D24 and discharged through photo diode D22 and diode D25. Device U3B is designed to hold its output (pin 9) high while C9 is charging and low while it is discharging.

The respective levels of illumination of photo diodes D22 and D23 determine the rate at which C9 is charged and discharged. Hence, if both photo diodes are equally illuminated, the charge rate and discharge rate are equal and the duty cycle of the oscillator is 50%. If illumination of the photo diodes is not equal, the duty cycle of the oscillator is not 50%. That is, as one photo diode receives more current than the other, the high (or low) portion of the oscillation will occupy a larger percentage of the total oscillator output waveform, thus indicating a change in angular position. Hence, the relative change of the duty cycle of the oscillator represents relative angular motion.

The input to the DIA is truly differential since any electrical or optical common mode noise present in the system is applied equally to both photo diodes D22 and D23, having equal and opposite effect on the high and low part of the oscillator output waveform. This noise is automatically cancelled out when the microprocessor calculates relative motion values from the oscillator output by subtracting the low part of the waveform from the high part.

The output of each DIA is applied to a corresponding input port on the Philips 80C51 central processing unit (CPU) designated U4. The CPU 58 measures the duration of the high part of the waveform and the duration of the low part of the waveform and subtracts one from the other to obtain the current relative angular position of the detector. It then subtracts the current angular position from the previous angular position to obtain the current relative motion.

To eliminate jitter caused by vibration of the motion sensing assembly, the CPU maintains a circular buffer of the last eight current relative motions. An average current relative motion which is free of jitter is calculated by adding the last eight current relative motions and dividing by eight.

As a final step, the CPU assembles each average current relative motion and the current mouse button state into three 8-bit packets which are compatible with the Microsoft mouse format and outputs them through its integral RS232C serial port to the transmitter.

While motion data is being transmitted via the serial port, the CPU scans the command keys 20. Each detected key press is assembled into three, 8-bit packets compatible with the Microsoft mouse motion format, except that the X motion value is set at 7F hexadecimal, and the Y motion value represents the scan code of the detected key.

The standard Microsoft mouse driver running on an IBM PC is modified to intercept any X motion value of 7F (hex), set it equal to 0, and to send the associated Y value to the keyboard driver as a scan code.

To conserve battery power, the remote turns itself off whenever it detects no motion for more than ten seconds. Power is turned back on when any key is pressed. Power is turned off and on via the power-save subsystem which includes transistor Q1 and voltage regulator U2. U2 is unique in that it contains an ON/OFF pin.

The CPU sets a POWER-SAVE flag whenever the average current relative motion is below a set value, indicating that the remote is not being moved. If the POWER-SAVE flag is set for more than ten seconds, the CPU sets pin 2 of the voltage regulator U2 to turn off the VCC power to the entire system. The CPU maintains its own VDD power by being connected directly to the battery. Shortly after turning off the VCC power, the CPU puts itself into a power-down mode in which it consumes negligible power while maintaining the current state of all its input/output pins.

While in the power-down mode, the CPU holds the emitter and base of Q1 high and holds the collector of Q1 low, biasing Q1 in the off state. When any keyboard key or mouse button is pressed, the base of Q1 momentarily drops to ground, pulling up the collector of Q1 and resetting the CPU. Upon reset, the CPU sets the collector of Q1 to 0 volts, disabling the reset function. Capacitor C2 ensures that only a short reset pulse is seen by the base of Q1, allowing the CPU to recognize and transmit the key or button that caused the reset.

In addition, the voltage regulator U2 isolates the noisy VDD, which is used to drive the CPU and the high-current transmitter output stage, from VCC which is used to drive the noise sensitive analog circuits.

Motion, button and command key data goes from the CPU's serial RS232C output port pin 11 into the transmitter. The transmitter is a frequency shift key (FSK) oscillator designed around the 555 timer chip U1 and modulated by the CPU serial port. A logical "1" on the oscillator reset input causes it to oscillate at 40 KHz. Logical "0" on the input stops the oscillation. FSK pulses are converted to infrared light by IREDs D26, D27 and D28.

The keyboard is scanned by using an industry standard algorithm. The keyboard is arranged into a matrix of rows (called scan lines) and columns (called receive lines). First all scan lines are reset to "low" and receive lines are set to "high". Pressing a key connects a scan line to a receive line, thus pulling the receive line to a logic "low". The process is repeated by reversing the role of scan and receive lines. This time, a scan line is pulled low if a key is down. The key is identified by knowing its scan line (row) and receive line (column) location.

Diodes D1 through D8 form a NAND gate whose output signals the CPU that a key is down. During power-down, the NAND gate output resets the CPU to wake it up. Eight receive lines and thirteen scan lines allow up to 104 keys. Five additional keys are connected directly to the CPU's port lines to perform independently as SHIFT, CTRL and ALT shift keys and as the left and right mouse buttons.

Referring now to FIG. 6, a block diagram showing the principal components of the base unit 12 is shown. As depicted, the base unit 12 includes a power supply 100, an infrared receiver 28, a serial port 32, mouse ID generator circuitry 102 and baud generator circuitry 104. In operation, the power supply 100 rectifies power taken from the computer's serial port in order to provide a constant voltage power signal to the rest of the circuitry. The IR receiver 28 converts light pulses received from the transmitter 10 (FIG. 1) to electrical pulses and applies them to the serial port 32. The mouse ID generator 102 and the baud generator 104 respond by sending the standard Microsoft mouse ID codes when the computer 14 requests that the device identify itself.

Referring now to FIG. 7, an electronic schematic of an actual implementation of the base unit of this invention is shown at 12. As depicted, the base unit includes a power supply 100, an infrared receiver 28, a serial port 32, mouse ID generator circuitry 102 and baud generator circuitry 104.

The power supply 100 delivers constant voltage DC power to the entire base unit by rectifying the computer's RTS and DTR signals, from the serial port 32, with diodes D3 and D4, and applying the output to a voltage regulator U3.

Data transmitted by the remote unit is sent as infrared light pulses, in a standard RS232C serial format, with logic one's modulated at 40 KHz and logic zero's modulated at 0 Hz. The IR receiver 28, based on the GP1U52Y infrared detecting unit U4, demodulates this signal and presents it directly to the TxD line of the serial port.

Upon power up of the computer, the standard Microsoft mouse driver sends a message to each serial port, asking the connected pointing device to identify itself. This serves the purpose of determining if the pointer is Microsoft compatible and which port it is connected to. The pointer must detect this message and, if it is Microsoft compatible, must respond with the "M" character (ASCII CD, hex).

The Mouse ID Generator 102 detects the driver message by monitoring the RTS line. When the RTS line goes low, the shift register U2 is loaded with a hard-wired 8-bit data word. When RTS returns high, the data word is shifted out to the serial port through the TxD line. While the mouse ID is being transmitted, the IR Detector is turned off by transistor Q1, gated by the RTS line. Capacitor C2 forces Q1 to remain off for a short time after RTS returns high, to allow all data in the shift register U2 to be shifted out.

The mouse ID is actually 11 bits long: 8 data bits, one start bit and two stopbits. But, because of the composition of the ID data, the last bit of the 8-bit ID and all the stop bits can be automatically generated, allowing an 8-bit shift register to be used. This is done as follows: When power is first applied, the RTS line is high and the shift register U2 is put into the shift mode. With the shift register's serial input wired to a logic "1" the shift register is continuously shifting out logic ones, effectively turning off diode D2 and allowing data from the IR Detector to get through. When the RTS line goes low, indicating a request for an ID, the shift register is parallel loaded with a start bit followed by the first 7 bits of the 8-bit ID. The last data bit which is a logic "1" and the stop bits are automatically shifted in via the shift register's serial input, right behind the data which was previously parallel loaded. When the entire ID is shifted out, the shift register contains all logic ones, again turning off diode D2, allowing data from the IR Detector to get through.

The baud generator 104 is a simple oscillator, based on the 555 timer chip, which is configured to produce the shift register clock needed to transmit data at 1,200 baud.

With reference to FIG. 8, an illustration of an alternate embodiment of the remote unit is shown. The remote unit is generally T-shaped, with an AT style keyboard 110 along the front and mouse buttons 40, a keypad 42 and a microphone 44 along the elongated leg of the remote. The elongated leg is shaped so that it can be easily grasped by one hand of the user, thus leaving the user's other hand free to operate the keyboard and buttons. Again, a vertically-oriented cylindrical handle, with one or more triggers functioning as mouse buttons, may be mounted to the bottom of the remote unit to provide a pistol-like configuration.

With reference to FIG. 9(a), a functional representation of an alternate embodiment of the angular motion detector is shown. This embodiment includes four light-measuring sensors (82, 84, 112 and 114) mounted at 90 degree intervals around the circumference of the cylindrical container 72, which receive reflected light from the bubble 70 via light pathways 86, 88, 116 and 118. The use of four sensors rather than two allows the sensor to sense a full 360 degrees rotation along the axis of the sources 74 and 76, rather than 180 degrees sensing which was possible in the previous embodiment. In the previous embodiment, the sensor was unable to distinguish between a level, right side up orientation and a 180 degree, or upside down, orientation. The addition of two more sensors, mounted along an axis perpendicular to the axis of the first two sensors, makes such a distinction possible, thereby allowing full 360 degree sensing. In all other respects, this embodiment is identical to the previous embodiment.

With reference to FIG. 9(b), a schematic showing an implementation of the 360 degree angular motion detector is shown. As shown, the first pair of sensors (82 and 84) are connected to one DIA 120, and the second pair of sensors (112 and 114) are connected to a second DIA 122. As the detector is rotated at a constant angular velocity, the widths of the PWM output signals from the DIAs vary sinusoidally, and the sinusoidal variation of the two signals are 90 degrees out of phase. Thus, the two signals are designated as pulse-width modulated sine (PWM SIN) and cosine (PWM COS) signals in the figure. The outputs of the two DIAs can be fed to the CPU which can apply a standard table lookup scheme performing an inverse-tangent operation to convert those outputs to an angle representing the orientation of the detector.

If the optional audio input capability is desired, a microphone, an audio amplification circuit, and an FM transmitter need to be added to the remote unit, and an FM receiver and an audio port are needed in the base unit. The microphone, mounted to the surface of the remote unit housing, would send an audio signal to the audio amplifier, which would amplify the signal and send it to the FM amplifier. The FM amplifier would then modulate the signal and transmit it. The FM receiver would receive and demodulate the FM signal, and send it to the audio port which would be connected to an audio input port on the computer. Further, if a stereo FM transmitter and receiver are used, one channel could be used for data and the other channel could be used for audio, thus obviating the need for two separate transmitters. As such technology is well known and commonly available, it is not shown in the schematics.

Although the present invention has been described above in terms of specific embodiments, it is anticipated that alterations and modifications thereof will no doubt become apparent to those skilled in the art. For example, instead of the bubble in oil embodiment described above, the motion detector might include a spherical or quasi-spherical reflector which rolls around the bottom of the container 72 under the influence of gravity to perform substantially the same function performed by the bubble 70. It is therefore intended that the following claims be interpreted as covering all such alterations and modifications as fall within the true spirit and scope of the invention.

What is claimed is:

1. In a multimedia display system including a display device, a computer that controls the display device, and input apparatus for supplying user input information to the computer, an improved input apparatus comprising:
(A) a remote unit, including:
  (1) sensor means for measuring the inclination of the remote unit relative to a horizontal plane and for producing corresponding inclination signals, said sensor means having
    (a) a housing having a first axis passing therethrough and positionable parallel to said horizontal plane, said housing containing a predetermined quantity of liquid,
    (b) an inclination sensitive element located within said housing, such that said element is free to move within said housing under the influence of gravity, the location of said element within said housing being directly related to rotation of said housing about said first axis, said element being capable of influencing the direction of light cast thereon as a function of its location within said housing, and (c) detector means for monitoring the location of said inclination sensitive element within said housing and for developing said inclination signals commensurate therewith, said detector means including (i) at least one light emitting component mounted along said first axis and operative to emit light in the direction of said element, (ii) a first pair of light measuring components mounted proximate said housing on opposite sides thereof and along a second axis passing through said housing, said first axis and said second axis being mutually perpendicular, said light measuring components being operative to receive light emitted from said light emitting component and influenced by said element and to develop outputs commensurate with a characteristic thereof, and (iii) signal producing means responsive to the outputs developed by said light measuring components and operative to produce said inclination signals;

(2) command switch means for sensing user input and producing corresponding command signals; and (3) transmitter means for transmitting said inclination and command signals; and (B) a base unit, including:

(1) receiver means for receiving said inclination and command signals from the remote unit; and (2) interface means for communicating the received inclination and command signals to the computer.

2. In a multimedia display system as recited in claim 1, wherein said detector means further includes a second light emitting component disposed along said first axis for illuminating said inclination sensitive element, said first and second light emitting components being positioned on opposite sides of said housing.

3. In a multimedia display system as recited in claim 1 or 2, wherein said detector means further includes a second pair of light measuring components mounted proximate said housing on opposite sides thereof and along a third axis passing through said housing, said first, second and third axes being mutually perpendicular, said second pair of components being operative to receive light influenced by said element and to develop outputs commensurate with a characteristic thereof.

4. In a multimedia display system as recited in claim 1, 2 or 3, wherein said light measuring components are photodiodes, and said signal producing means include oscillator circuitry in which the duty cycle of the oscillator output is dependent upon the outputs of the photodiodes, such that said inclination signals are pulse width modulated signals whose duty cycle corresponds to the angular orientation of said housing relative to said first axis.

5. In a multimedia display system as recited in claim 4, wherein said inclination sensitive element is a gaseous bubble that is less dense than said liquid, such that the bubble is buoyant in said liquid.

6. In a multimedia display system as recited in claim 5, wherein said command switch means include an alphanumeric keyboard for generating alphanumeric signals for transmission to the computer.

7. In a multimedia display system as recited in claim 6, wherein said transmitter means and said receiver means communicate by means of encoded infrared pulsed light communication.

8. In a multimedia display system as recited in claim 6, wherein said transmitter means and said receiver means communicate by means of encoded radio frequency communication.

9. In a multimedia display system as recited in claim 1, 2 or 3 wherein said remote unit further includes a microphone for sensing external audio signals, and said transmitter means includes means for transmitting said audio signals.

10. In a multimedia display system as recited in claim 9, wherein said transmitter utilizes stereo frequency modulation communication having first and second channels, whereby said inclination and command signals are transmitted using the first channel, and said audio signals are transmitted using the second channel.

11. In a multimedia display system as recited in claim 1, wherein said inclination sensitive element is a gaseous bubble that is less dense than said liquid, such that the bubble is buoyant in said liquid.

12. In a multimedia display system as recited in claim 1, 2 or 3, wherein said command switch means include an alphanumeric keyboard for generating alphanumeric signals for transmission to the computer.

13. In a multimedia display system as recited in claim 1 or 3 wherein said housing forms a generally cylindrical shaped chamber containing said liquid and said inclination sensitive element, said light emitting components are disposed along the central axis of said chamber and an opposite sides thereof, and said first pair of light measuring components are disposed on opposite sides of said chamber.

14. In a multimedia display system as recited in claim 13 wherein said first pair of light measuring components are disposed along a first diameter of said chamber.

15. In a multimedia display system as recited in claim 14 wherein said second pair of light measuring components are disposed along a second diameter of said chamber.

16. In a multimedia display system as recited in claim 1, wherein said remote unit further includes:

(1) another sensor means for measuring the inclination of the remote unit relative to said horizontal plane and for producing corresponding additional inclination signals, said other sensor means having (a) another housing having a third axis passing therethrough and positionable parallel to said horizontal plane, said third axis being orthogonally positionable with respect to said first axis, said other housing containing a predetermined quantity of liquid, (b) another inclination sensitive element located within said other housing, such that said other element is free to move within said other housing under the influence of gravity, the location of said other element within said other housing being directly related to rotation of said other housing about said third axis, said other element being capable of influencing the direction of light cast thereon as a function of its location within said other housing, and (c) other detector means for monitoring the location of said other inclination sensitive element within said other housing and for developing said other inclination signals commensurate therewith, said other detector means including (i) at least one other light emitting component mounted along said third axis and operative to emit light in the direction of said other element, (ii) a second pair of light measuring components mounted proximate said other housing on opposite sides thereof and along a fourth axis passing through said other housing, said third axis and said fourth axis being mutually perpendicular, said other light measuring components being operative to receive light emitted from said light emitting component and influenced by said other element and to develop outputs commensurate with a characteristic thereof, and (iii) other signal producing means responsive to the outputs developed by said other light measuring components and operative to produce said additional inclination signals.

17. In a multimedia display system as recited in claim 16 wherein said other housing forms generally cylindrical shaped second chamber containing said other liquid and said other inclination sensitive element, said other light emitting components are disposed along the central axis of said second chamber and on opposite sides thereof, and said second pair of light measuring components are disposed on opposite sides of said second chamber.

18. A sensor for measuring inclination with respect to a horizontal plane and for producing a corresponding inclination signal, comprising:

(A) a housing;

(B) an inclination sensitive element located within said housing and free to move within said housing under the influence of gravity, the location of said element within said housing being directly related to the inclination of said housing relative to said horizontal plane, said element being capable of influencing the direction of light as a function of its location within said housing; and (C) detector means for monitoring the location of said inclination sensitive element within said housing and for developing corresponding inclination signals, said detector means including (1) light emitting means for illuminating said inclination sensitive element, said light emitting means being disposed along a first axis passing through said housing, and operative to emit light in the direction of said element, (2) light detecting means for detecting light emitted from said light emitting means and influenced by said inclination sensitive element and including a first pair of light measuring components mounted on opposite sides of said housing and along a second axis passing through said housing, said first axis and said second axis being mutually perpendicular, said light measuring components being operative to receive light influenced by said element and to develop outputs commensurate with a characteristic thereof; and (3) signal producing means responsive to the output developed by the said light measuring components and operative to produce said inclination signals.

19. A sensor as recited in claim 18, wherein said light emitting means includes two light emitting components respectively mounted along said first axis on opposite sides of said housing facing each other and operative to emit light in the direction of said element.

20. A sensor as recited in claim 19 wherein said light detecting means further includes a second pair of light measuring components mounted proximate said housing on opposite sides thereof and along a third axis passing through said housing, said first, second and third axes being mutually perpendicular, said second pair of light measuring components being operative to receive light influenced by said element and to develop outputs commensurate with a characteristic thereof.

21. A sensor as recited in claim 20, wherein said detector means further includes signal producing means for producing said inclination signals, said inclination signals being pulse width modulated signals whose duty cycle corresponds to the angular orientation of said sensor.

22. A sensor as recited in claim 21, wherein said light measuring components are photodiodes, and said signal producing means includes oscillator circuitry in which the duty cycle of the oscillator output is dependent upon the outputs of the photodiodes.

23. A sensor as recited in claim 22, wherein said housing contains a predetermined quantity of liquid for damping the movement of said inclination sensitive element.

24. A sensor as recited in claim 23, wherein said inclination sensitive element is a gaseous bubble that is less dense than said liquid, such that the bubble is buoyant in said liquid.

25. A sensor as recited in claim 18, wherein said detector means further includes signal producing means for producing said inclination signals, said inclination signals being pulse width modulated signals whose duty cycle corresponds to the angular orientation of said sensor.

26. A sensor as recited in claim 18, wherein said housing contains a predetermined quantity of liquid for damping the movement of said inclination sensitive element.

27. A sensor as recited in claim 19, wherein said light measuring components are photodiodes, and said signal producing means includes oscillator circuitry in which the duty cycle of the oscillator output is dependent upon the outputs of the photodiodes.

28. In a multimedia display system as recited in claim 20 or 20 wherein said housing forms a generally cylindrical shaped chamber containing said liquid and said inclination sensitive element, said light emitting components are disposed along the central axis of said chamber and on opposite sides thereof, and said first pair of light measuring components are disposed on opposite sides of said chamber.

29. In a multimedia display system as recited in claim 28 wherein said first pair of light measuring components are disposed along a first diameter of said chamber.

30. In a multimedia display system as recited in claim 21 wherein said housing forms a generally cylindrical shaped chamber containing said liquid and said inclination sensitive element, said first axis is the central axis of said chamber, said second axis lying along a first diameter of said chamber, and said third axis lying along a second diameter of said chamber.

31. A method of generating signals indicative of the angle of inclination of an object relative to a horizontal plane comprising the steps of:

providing said object with means forming a generally cylindrical chamber having a central axis positionable parallel to said horizontal plane;

filling said chamber with a predetermined quantity of liquid;

providing a light reflective element within said chamber which is free to move within said liquid and which has the characteristic that its position within said chamber is related to the angle of rotation of said object about said central axis;

causing light to pass into said chamber in the direction of said central axis so as to be reflected by said light reflective element;

detecting light reflected by said element in a first direction along a diameter of said chamber and generating a corresponding first electrical signal;

detecting light reflected by said element in a second direction along said diameter of said chamber and generating a corresponding second electrical signal; and using said first and second electrical signals to provide information indicative of the angle of inclination of said object.

32. A method of generating signals as recited in claim 32 and further comprising the steps of:

detecting light reflected by said element in a third direction along another diameter of said chamber orthogonal to said first mentioned diameter and generating a corresponding third electrical signal;

detecting light reflected by said element in a fourth direction along said other diameter of said chamber and generating a corresponding fourth electrical signal; and using said third and fourth electrical signals in combination with said first and second electrical signals to provide information indicative of the angle of rotation of said object about said central axis.

33. A method of generating signals as recited in claim 31 and further comprising the steps of:

transmitting said information to a remote receiver; and using the received information as an input to a computer driven system.

34. A method of generating signals as recited in claim 32 and further comprising the steps of:

transmitting said information to a remote receiver; and using the received information as an input to a computer driven system.

35. A method of generating signals indicative of the angle of inclination of an object relative to a horizontal plane as recited in claim 32 and further comprising the steps of:

providing said object with means forming another generally cylindrical chamber having another central axis postionable parallel to said horizontal plane and orthogonal with respect to the first said central axis;

filling said other chamber with a predetermined quantity of liquid;

providing another light reflective element within said other chamber which is free to move within the liquid and which has the characteristic that its position within said other chamber is related to the angle of rotation of said object about said other central axis;

causing light to pass into said other chamber in the direction of said other central axis so as to be reflected by said other light reflective element;

detecting light reflected by said other element in a third direction along a diameter of said other chamber and generating a corresponding third electrical signal;

detecting light reflected by said other element in a fourth direction along said diameter of said other chamber and generating a corresponding fourth electrical signal; and using said third and fourth electrical signals to provide other information indicative of the angle of inclination of said object.

* * * * *